United States Patent
Sardesai et al.

(10) Patent No.: US 7,333,736 B2
(45) Date of Patent: Feb. 19, 2008

(54) METHOD AND APPARATUS FOR CONTROLLING MODULATOR PHASE ALIGNMENT IN A TRANSMITTER OF AN OPTICAL COMMUNICATIONS SYSTEM

(75) Inventors: Harshad Sardesai, Ellicott City, MD (US); Steve Sluz, Glen Rock, PA (US)

(73) Assignee: Ciena Corporation, Linthicum, MD (US)

( * ) Notice: Subject to any disclaimer, the term of this patent is extended or adjusted under 35 U.S.C. 154(b) by 694 days.

(21) Appl. No.: 10/610,870

(22) Filed: Jul. 2, 2003

(65) Prior Publication Data

US 2005/0002675 A1   Jan. 6, 2005

(51) Int. Cl.
*H04N 10/12* (2006.01)

(52) U.S. Cl. ............... 398/201; 398/188; 398/189; 398/198

(58) Field of Classification Search ......... 398/182–202
See application file for complete search history.

(56) References Cited

U.S. PATENT DOCUMENTS 6,650,846 B1 * 11/2003 Ito ........................... 398/184

6,819,480 B2 * 11/2004 Altman et al. ......... 359/337.13
7,068,950 B2 * 6/2006 Sinsky ....................... 398/198

OTHER PUBLICATIONS

Sinsky, Jeffrey H., High-Speed Data and Pulse-Carver Alignment in Dual mach-Zehnder Modular Optical Transmitters Using Microwave Signal Processing, Journal of Lightwave Technology, vol. 21, No. 2, (2003).

* cited by examiner

*Primary Examiner*—Jason Chan
(74) *Attorney, Agent, or Firm*—Clements Walker; Christopher L. Bernard; Tyler S. Brown

(57) ABSTRACT

A method and apparatus for controlling phase alignment in a modulator of a transmitter in an optical communications system utilizes an RF power signature to tune phase alignment. A portion of the optical signal is tapped and converted to an electrical signal. An electrical band-pass filter and RF detector examines a narrow slice of the RF spectrum and utilize the detected RF power to control phase alignment between the data modulator and pulse carver. Another portion of the optical signal is multiplied by the pulse carver clock, filtered and integrated in order to generate a second phase control signal for controlling the relative phase of a dual arm modulator being used as the pulse carver in one embodiment.

26 Claims, 14 Drawing Sheets

METHOD AND APPARATUS FOR CONTROLLING MODULATOR PHASE ALIGNMENT IN A TRANSMITTER OF AN OPTICAL COMMUNICATIONS SYSTEM

FIELD OF THE INVENTION

The present invention relates to a method and apparatus for controlling modulator phase alignment in a transmitter of an optical communications system.

DESCRIPTION OF RELATED ART

A transmitter in an optical communications system transmits a data stream by modulating the intensity of light (an optical carrier signal) guided via optical fiber. In existing optical communications systems, a non-return-to-zero (NRZ) modulation scheme, in which a sequence of 1s is transmitted without switching the intensity of the optical carrier signal to zero between each data bit, is commonly used. NRZ modulation utilizes less frequency spectrum as compared to a return-to-zero (RZ) modulation scheme, in which the intensity of the optical carrier signal always returns to zero in between bits of the data stream. Narrower frequency spectrum for modulated data is beneficial for wavelength division multiplexing (WDM) as it reduces crosstalk between the neighboring WDM channels and may also lead to a greater number of channels with narrower channels spacing (e.g., 25 GHz instead of 50 GHz or 100 GHz) within the same frequency band. For this reason, NRZ modulation is particularly suitable for WDM optical communications networks in which a plurality of narrowly-spaced channels, e.g., 25 GHz channel spacing, are multiplexed on the same optical fiber.

For transmission over long distances, however, RZ modulation has advantages over NRZ modulation because RZ modulation is less sensitive to non-linear effects, more tolerant to first order PMD, and has better receiver sensitivity. For high data rates, e.g., 40 Gbps or higher, standard RZ modulation requires relatively wide channel spacing. For example, 160 GHz channel spacing may be required to transmit at 40 Gbps using standard RZ modulation. Therefore, to accommodate narrower channel spacing, such as 100 GHz channel spacing for 40 Gbps data rates, variants of RZ modulation have been considered. One such RZ variant being considered is carrier-suppressed-return-to-zero (CSRZ) modulation.

More specifically, in the CSRZ format, in order to obtain a narrower modulated spectrum, the phase of the neighboring pulses differ by $\pi$. This also leads to suppressed interaction between the neighboring pulses. As a result, the CSRZ format has a larger tolerance to the degradation of signal quality due to non-linear effects such as intra-channel cross phase modulation and intra-channel four-wave-mixing.

CSRZ modulation is usually a two-step process. In the first step, a standard NRZ data modulator driven by electrical NRZ data pulses modulates light from a laser such as a continuous wave distributed feedback (CW DFB) laser. A second modulator carves out optical pulses from the modulated optical NRZ bits, and for this reason it is often referred to as a pulse carver. The pulse carver is driven by a clock signal with frequency equal to half the data rate. By biasing the second pulse carving modulator at the null of its transmission characteristics, CSRZ optical pulses can be obtained.

To achieve optimum CSRZ modulation, it is important to control of the phase delay between the pulse carver and optical NRZ data stream. This phase delay essentially defines the carve point (where within the NRZ bits the CS-RZ pulses are carved). Not only is it important to set the correct phase delay while assembling the transmitter, it is also important to have a closed-loop control circuit that actively tracks any phase delay changes that may be caused due to environmental effects such as temperature and humidity.

FIG. 1 generally illustrates a typical transmitter configuration for implementing CSRZ modulation in an optical communications system. As seen in FIG. 1, the transmitter 1 utilizes two cascaded optical modulators 20, 50. The first modulator 20 is a data modulator, which is driven by a first driver 22 to modulate light received from a laser 10 via optical fiber 12. The first driver 22 drives the data modulator 20 in accordance with the data stream being transmitted at a data rate dictated by a data and synchronous clock source 30.

Conventionally, the data stream being transmitted is a stream of digital 1s and 0s (i.e., binary data). The data modulator 20 amplitude-modulates the incoming light to generate a data modulated optical signal, which is supplied to the second modulator 50. In the CSRZ-based transmitter configuration of FIG. 1, the second modulator is a "CSRZ pulse carver" or more simply a "pulse carver" which is driven by a second driver 52 to modulate the data modulated optical signal supplied by the data modulator 20 so that it takes on the characteristic of carrier-suppressed (i.e., the DC component of the modulated optical signal is suppressed) pulse train. The second driver 52 drives the CSRZ pulse carver 50 at a clock rate that is half the data rate. In some implementations, CSRZ pulse carving may be performed prior to data modulation (i.e., the CSRZ pulse carver 50 precedes the data modulator 20).

For the CSRZ-based transmitter 1 of FIG. 1 to operate properly, the output of the CSRZ pulse carver 50 must be phase shifted by half of a bit slot (e.g., 12.5 ps for 40 Gbps data) with respect to the data modulated signal output by the data modulator 20. A phase shifter 54 connected between the data and synchronous clock source 30 and the second driver 52 phase-shifts the clock signal used to drive the CSRZ pulse carver 50.

Over the course of operation, however, components of the transmitter 1 may cause phase drift, resulting in distortion of the CSRZ output. FIG. 2A illustrates proper phase alignment between the CSRZ pulse train and the data stream (represented as a NRZ square waveform in FIG. 2A). In FIG. 2A, the CSRZ output is centered at half the bit-period of the NRZ waveform representing the data stream being transmitted. FIG. 2B illustrates a corresponding "eye diagram" for the CSRZ output of FIG. 2A, which shows little or no deterioration in the CSRZ-modulated optical carrier signal.

FIG. 3A illustrates the situation of phase misalignment between the CSRZ pulse train with respect to the data stream, which may be caused by such factors as component aging and temperature changes. As seen in FIG. 3A, the CSRZ pulses are off-center in relation to the bit-period of the NRZ waveform representing the data stream being transmitted. FIG. 3B illustrates the resulting deterioration in the eye diagram. Although CSRZ pulse carver phase can be adjusted manually in the laboratory to visually align the CSRZ pulse train with the data stream by observing the eye diagram of the CSRZ-modulated optical signal on an oscilloscope, such manual phase adjustment cannot be implemented once the CSRZ-based transmitter is deployed in the field. Furthermore, possible techniques proposed thus far to achieve phase alignment in a CSRZ-based transmitter of an optical communications system would add substantial complexity/cost to the transmitter.

A second phase delay adjustment and control is also needed depending on the exact mechanics of the pulse carver. In order to reduce the RF voltage swing requirement, dual drive Mach-Zehnder modulators are conventionally used as pulse carvers. For such modulators, the phase difference between the two drive voltages applied to the two arms of the modulator should have a pi ($\pi$) phase shift. This phase shift can also drift, giving imperfect CSRZ modulation and, therefore, needs adjustment and closed loop control.

BRIEF DESCRIPTION OF THE DRAWINGS

Embodiments of the invention will become understood from the detailed description given hereinbelow and the accompanying drawings, which are given by way of illustration only and, thus, are not limitative of the present invention, and wherein.

DETAILED DESCRIPTION OF THE INVENTION

The present invention is a method and an apparatus for controlling modulator phase alignment in a transmitter of an optical communications system. The following detailed description of the invention refers to the accompanying drawings. The same reference numbers in different drawings identify the same or similar elements. The following detailed description does not limit the invention. Instead, the scope of the invention is defined by the pending claims and equivalents thereof.

Although the following detailed description uses expressions such as "connected" and "coupled" such terms are used as relative terms and do not require a direct physical connection. For example, the expression "optically coupled" as used herein refers to any connection, coupling, link, or the like by which optical signals are imparted from one optical system element to another. Such "optically coupled" elements are not necessarily directly connected to one another and may be separated by intermediate components or devices. Likewise, expressions such as "operatively connected" as used herein are relative terms and do not require a direct physical connection. Likewise, expressions describing signals being "supplied" from one element to another, or similar expressions, do not require direct connection, in that signals may be indirectly supplied from one element to another via intermediate elements.

Figure 4:
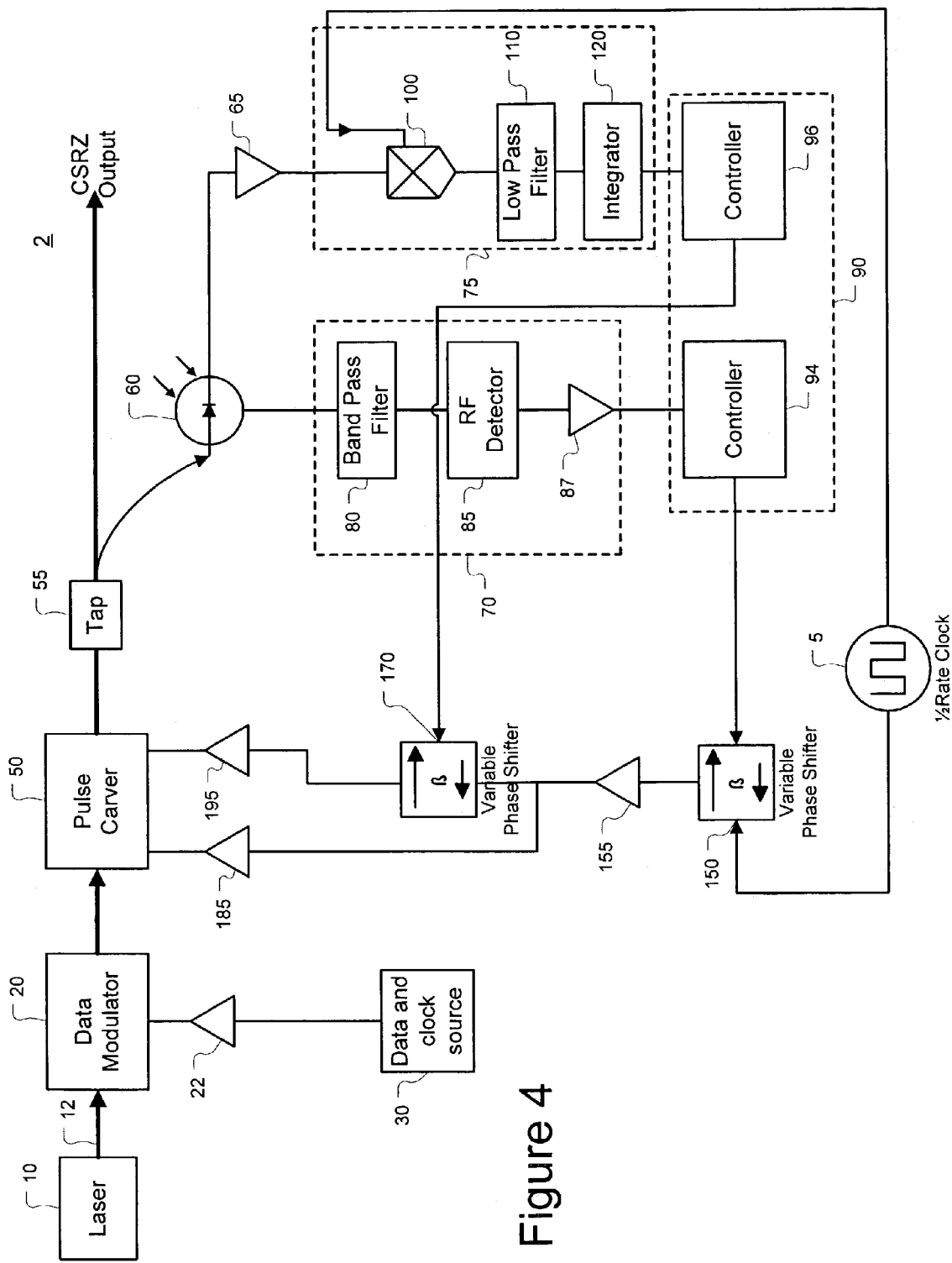
FIG. 4 is a block diagram of a CSRZ-based transmitter, which performs phase alignment between the data modulator and pulse carver and between the arms of a dual-arm data modulator in accordance With principles of the present invention.

Referring now to the drawings, FIG. 4 illustrates a transmitter configuration for implementing CSRZ modulation in an optical communications system according to an exemplary embodiment of the present invention. The CSRZ-based optical transmitter 2 according to this embodiment includes the following main elements: a laser 10; a data modulator 20; a data and synchronous clock source 30; a first modulator driver 22; and a CSRZ pulse carver 50. The optical transmitter 2 also includes a tap or optical coupler 55 connected to the output of the CSRZ pulse carver 250. The tap 55 is connected to a photodiode 60 or other optical-to-electrical converter element.

Because the optical transmitter 2 shown in FIG. 4 performs two types of phase control by adjusting two different phase delays, for ease of reference the phase delay between the data signal and pulse carver drive signal will be referred to as Phase Delay 1 (PD1) and the phase delay between the two arms of the pulse carver 50 (for a dual drive pulse carver) as Phase Delay 2 (PD2). Similarly, the elements responsible for detecting the phase error for controlling PD1 and PD2 will be respectively referred to herein as the first (or PD1) phase error detector 70 and the second (or PD2) phase error detector 75.

The tapped optical output of the pulse carver 50 is supplied to an optical-to electrical-converter element such as a photodiode 60. The photodiode should have bandwidth to operate at the line rate, but need not have superlative sensitivity, phase response, or noise loaded performance since it will typically see a very clean optical signal outputted by the transmitter. As an example, the photodiode 60 may have a spectral response of around 20-30 Ghz.

The photo-electrically-converted light signal is supplied by the photodiode 60 to first and second phase error detectors 70, 75.

The first phase error detector 70 is composed of an electrical band-pass filter 80 and RF detector 85. The band-pass filter 80 may have a passband of around 25 to 30 Ghz (3 dB). The first phase error detector 70 outputs a first phase error signal to a controller 94 that drives a variable phase shifter 150. An amplifier 87 may be used in the first phase control circuit 70 to match voltage levels between the RF detector 85 and the controller 94.

The second phase error detector 75 is composed of a mixer 100, low pass filter 110, and integrator 120 all of which are off-the-shelf components (e.g. a Miteq M1826 mixer may be used as mixer 100). The second phase error detector 75 outputs a second phase error alignment signal to a controller 96 that drives a variable phase shifter 170. As will be explained in more detail below, the phase shifter 170 adjusts the relative phase of the two arms of the pulse carver 50 such that a pi ($\pi$ radians) phase shift is maintained at all times. A ½ rate clock signal is supplied by the ½ rate clock 5 to the mixer 100 and to the variable phase shifter 150.

The laser 10 may be any suitable light source and preferably has a narrow line width to avoid interfering with other channels that is particularly useful when the CSRZ output is optically multiplexed with other channels to form a wavelength division multiplexed (WDM) signal. Suitable examples of laser 10 include a Distributed Feedback (DFB) laser or a Distributed Bragg Reflector (DBR) laser. In some implementations, the laser 10 may be tunable to generate an optical carrier signal at a controllable wavelength. Since the invention is insensitive to optical wavelength, it would work equally well if the source 10 were a tunable laser.

As discussed above with reference to FIG. 1, a CSRZ-based transmitter utilizes two cascaded modulators to generate a CSRZ output. Both modulators, i.e., the data modulator 20 and the CSRZ pulse carver 50, which together form a transmitter modulator configuration, may each be a conventional modulator such as a Lithium-Niobate Mach-Zehnder modulator or other conventional modulator. The FIG. 4 embodiment preferably utilizes a dual-arm Mach-Zehnder modulator for the pulse carver 50.

In the embodiment illustrated in FIG. 4, the data modulator 20 is driven by the first modulator driver 22 to modulate light supplied by the laser 10 via optical fiber 12. The first modulator driver 22 drives the data modulator 20 in accordance with the data stream to be transmitted at a data rate dictated by the data and synchronous clock source 30 to generate and output a data modulated optical signal. The data stream supplied to the first modulator driver 22 by the data and synchronous clock source 30 may be a stream of digital 1s and 0s (e.g., binary data represented by a NRZ square waveform).

The two arms of the CSRZ pulse carver 50 are respectively driven by the modulator drivers 185, 195 to modulate the data-modulated optical signal supplied by the data modulator 20 so that it takes on the characteristic of a carrier-suppressed pulse train. The CSRZ pulse carver 50 is driven by modulator drivers 185, 195 at a clock speed that is half the data rate.

To supply a suitable clock signal for driving the CSRZ pulse carver 50, a ½ rate clock 5 may be utilized. The ½ rate clock and the clock signal from the data and clock source 30 should be synchronized (not shown in the figures). Thus, the implementation of the invention preferably involves known techniques for synchronizing these clocks such as, for example, a common clock source that is frequency divided or multiplied as necessary to produce the base rate clock for the data source 30 and a ½ rate clock that is ½ the rate of the base rate clock for the second (PD2) phase control circuit. For ease of illustration, the ½ rate clock 5 and clock source 30 are shown as separate elements but it is to be understood that these clocks may originate from a single source. The base rate clock frequency should preferably match standardized data rates such as 10 Ghz or 40 Ghz but could, of course, be any feasible data rate desired.

Figure 1:
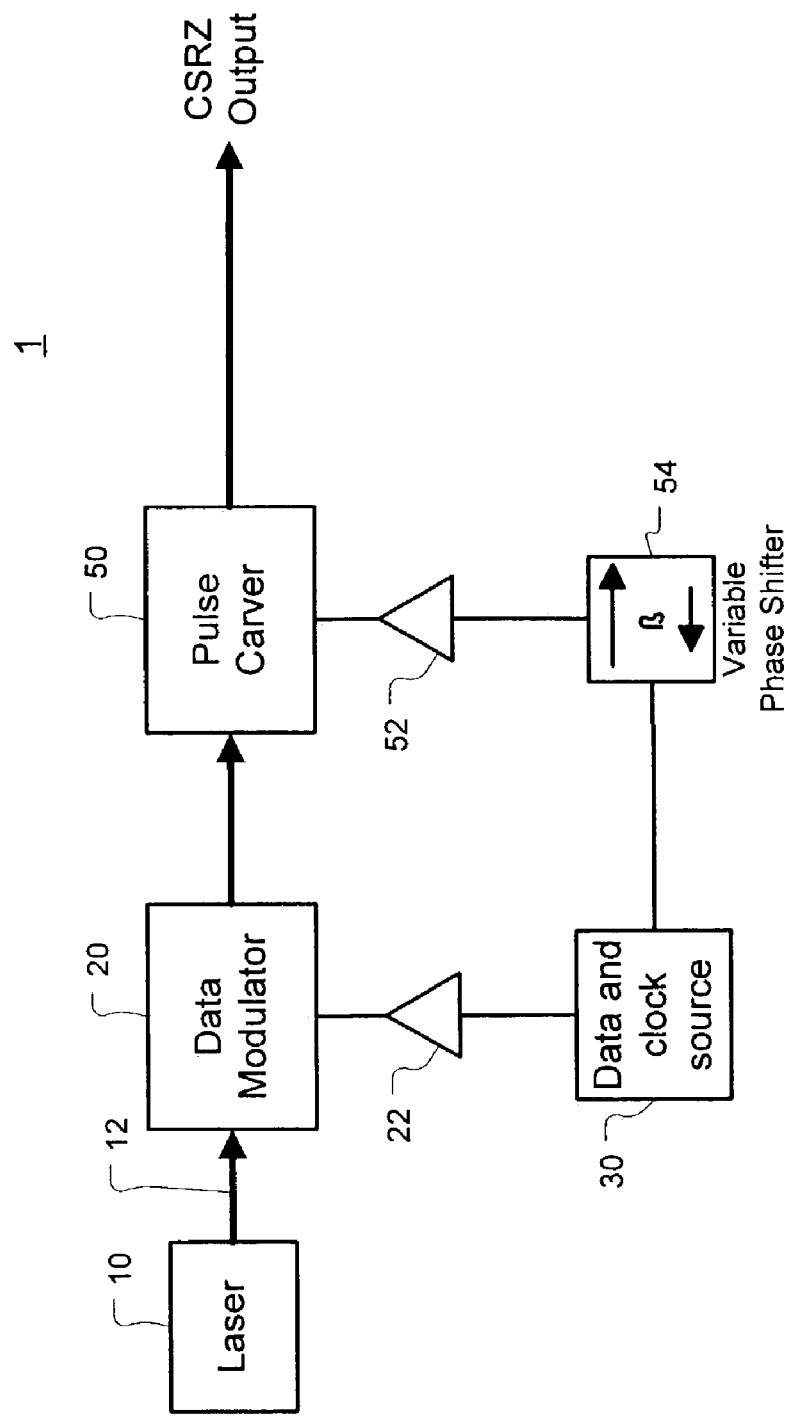
FIG. 1 is a block diagram of a conventional CSRZ-based transmitter in an optical communications system.
Figure 2A:
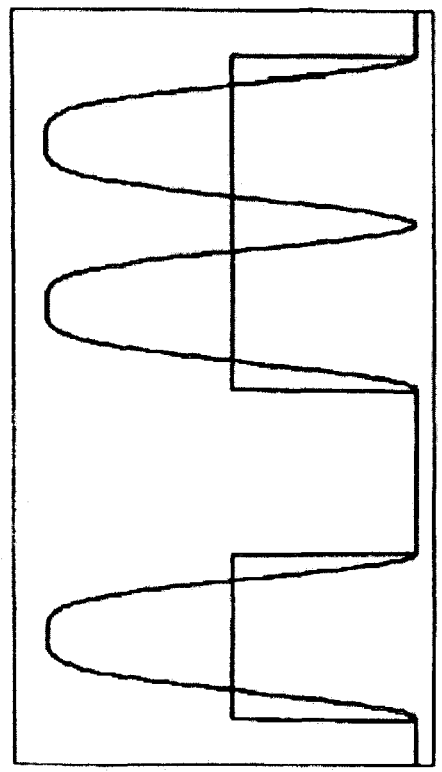
FIG. 2A illustrates proper phase alignment of a CSRZ pulse train with respect to a data stream being transmitted.
Figure 2B:
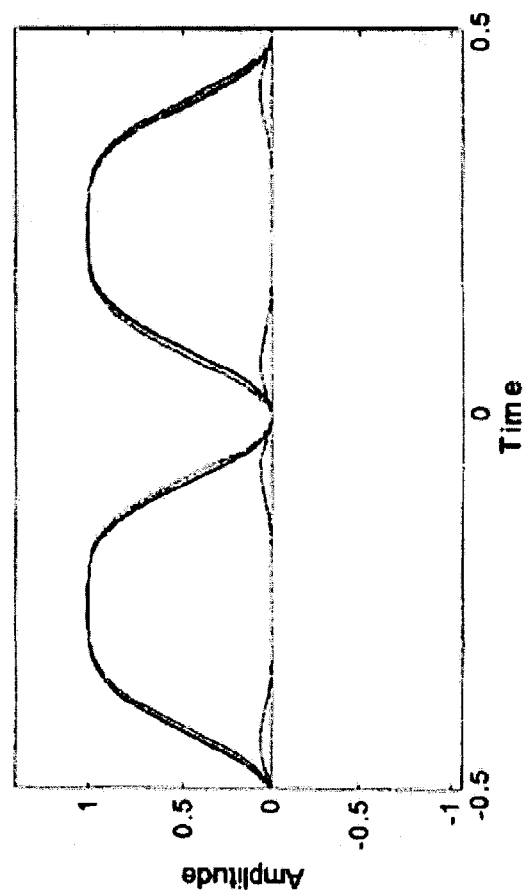
FIG. 2B is an eye diagram showing modulated signal quality for the phase alignment of FIG. 2A.
Figure 3A:
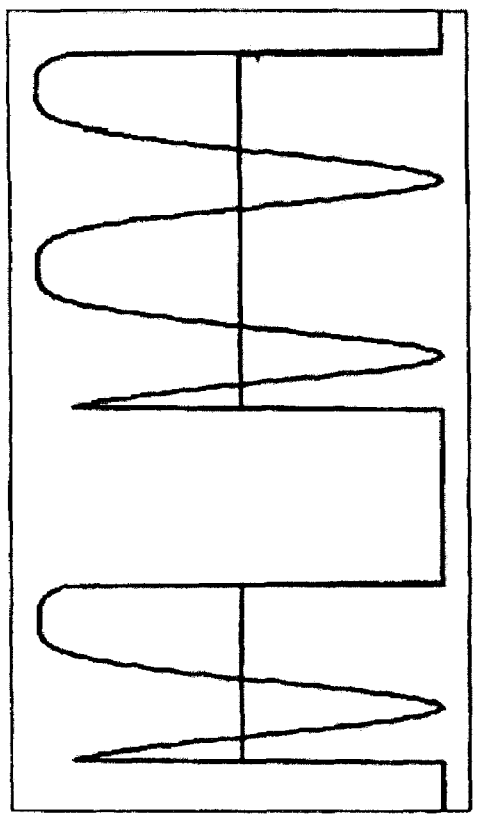
FIG. 3A illustrates phase misalignment of a CSRZ pulse train with respect to the data stream being transmitted.
Figure 3B:
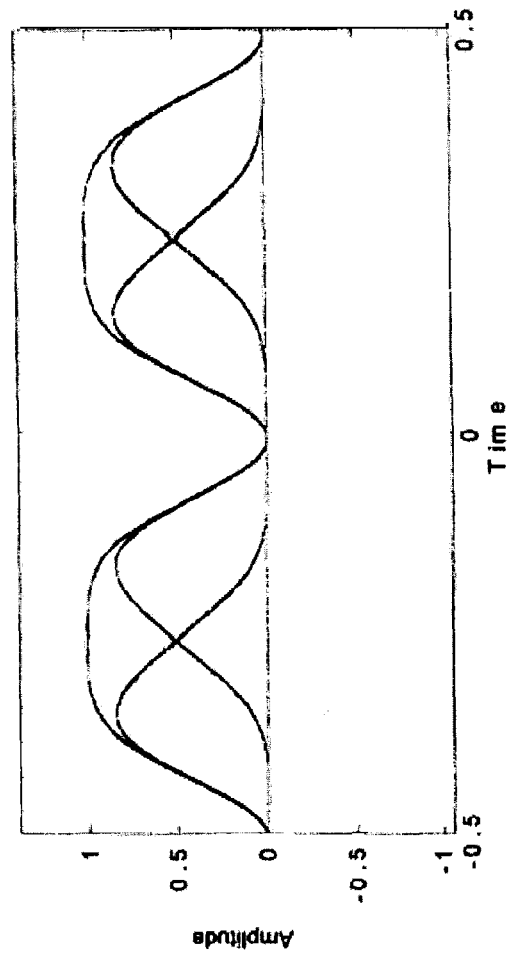
FIG. 3B is an eye-diagram showing deterioration in the modulated signal quality caused by the phase misalignment of FIG. 3A.

Furthermore, as discussed above with reference to the conventional arrangement of FIG. 1, proper operation of the CSRZ-based transmitter 2 requires that the output of the CSRZ pulse carver 50 be phase shifted by half of a bit slot/period (e.g., 12.5 ps for 40 Gbps data) with respect to the data modulated signal output by the data modulator 20. In the invention, phase shifter 150 is provided between the ½ rate clock 5 (½ rate clock synchronous to data and clock source 30) and the pulse carver drivers 185, 195 to phase shift the clock signal provided to the pulse carver 50. In the embodiment of FIG. 4, the phase shifter 150 adjusts the clock signal output to the modulator drivers 185, 195 under control of the controller 94.

The phase shifters 150, 170 are conventional elements, such as an off-the-shelf voltage controlled phase shifter. In one exemplary implementation of the present invention, the data and synchronous clock source 30 provides 40 Gbps data and a synchronous 40 GHz clock, such that the first modulator driver 22 drives the data modulator 20 at 40 Gbps and the second modulator drivers 185, 195 drive the CSRZ pulse carver 50 at 20 GHz. It should be understood that, although principles of the present invention provide particular advantages in high-speed optical transmission systems (40 Gbps and beyond), the invention is applicable to a wide range of data rates for the transmitter 2.

Furthermore, as in the conventional CSRZ-based optical transmitter discussed above with reference to FIG. 1, the data modulator 20 and the CSRZ pulse carver 50 may be reversed in order. Likewise, the phase adjustment by phase shifter 150 may be applied to the data modulator 20 rather than the pulse carver 50 to adjust the relative phase.

The controllers 94, 96 in this embodiment may be implemented using existing devices such as a microprocessor-based control device, an application specific integrated circuit (ASIC), or an electronic circuit. Although illustrated as discrete components, the functionality of the controllers 94, 96 (described in greater detail below) may be combined such that a single controller performs control of both PD1 and PD2. Furthermore, one or both of the controllers 94, 96 may be combined with other elements performing aspects of transmitter or optical node control.

OPERATION OF INVENTION

In accordance with principles of the present invention, the controller 94 executes a phase-control loop to adjust phase delay (PD1) of the CSRZ pulse carver 50 to maintain proper alignment between the CSRZ output and the data being transmitted (i.e., to avoid deterioration of the CSRZ format modulated optical signal output by the transmitter 2). Furthermore, the controller 96 executes a second phase-control loop to adjust phase delay (PD2) of the pulse carver 60 arms.

More specifically, the invention is based on the technique of looking at the RF response of the device under test for signatures that may be sensitive to PD1 and PD2. In particular, if PD1 is not set at the optimum value, the RF power in the frequency range between 20-30 GHZ (for a 40 Gb/s modulator) is reduced. As PD1 is brought into phase alignment, the RF power in the above-mentioned band-pass starts increasing, reaching a maximum value for best alignment.

The inventors performed experiments at 40 Gb/s data rate to confirm this behavior by slowly misaligning the phase and simultaneously measuring both the RF power spectral density curve on a spectrum analyzer and the CS-RZ optical eye on an oscilloscope. With the theory proven in this manner, a phase adjusting scheme was formulated that is based on maximizing the RF power detected through a band-pass filter. Bit Error Rate (BER) measurements indicate an excellent correlation between the maximum filtered RF power and the lowest BER. To implement this technique the transmitter 2 illustrated in FIG. 4 may be utilized.

The transmitter 2 of FIG. 4 performs phase adjustment of PD1 and PD2 generally as follows. A portion of the modulated CS-RZ optical signal is tapped off by tap 55 and fed to a photodiode 60 that operates at the transmitter data rate (rate of data and clock source 30). The detected electrical signal is split into two parts: one part is used for the circuit that controls delay PD1 (delay between NRZ data and CS-RZ pulses) and the other part for the circuit that controls delay PD2 (delay between the arms of the differential pulse carver modulator). The operation of each circuit is described separately below.

Control Circuit for PD1:

The detected electrical signal from photodiode 60 is band-pass filtered by band pass filter 80 and fed into a RF detector 85.

The band pass filter 80 preferably has a band pass of between 20 and 30 Ghz for a data rate of 39.8128 GBs. For that same data rate, the most preferred pass band is from 25 to 30 GHz. In general terms, the band-pass filter preferably has a band pass of between 0.5 $f_o$ and 0.75 $f_o$ where $f_o$ is the data rate (frequency of the data and synchronous clock source 30). The most preferred embodiment, as confirmed by experimental results, utilizes a pass band for band pass filter of between 0.627 $f_o$ and 0.75 $f_o$.

The RF detector 85 detects the RF power of the band-pass filtered signal the result of which is fed to the controller 94 and which provides a basis for control. The controller 94 controls variable phase shifter 150 that introduces the proper delay between the clock from ½ rate clock 5 and the optical NRZ data stream.

The control algorithm implemented by controller 94 to adjust PD1 may simply adjust the phase shifter 150 in small steps to maximize the detected RF power. As discussed above, the controller 94 controls the amount of PD1 (phase delay 1) to maximize the RF power in the pass band of band pass filter 80. In the phase-control process, the controller 94 may incrementally increases/decreases the phase delay (PD1) imparted by the phase shifter 150 until the RF power in the pass band is at a maximum.

Figure 16:
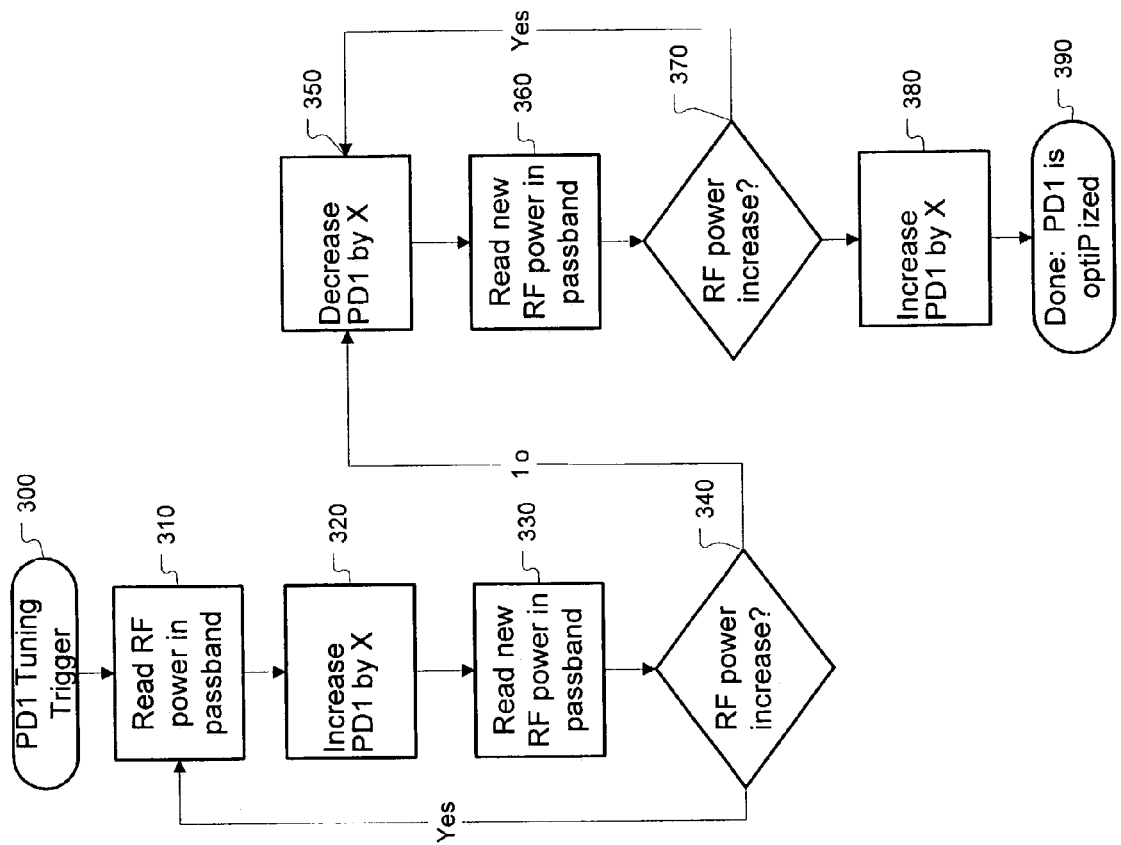
FIG. 16 illustrates a phase-control loop that is executed by the controller in accordance with an implementation of the present invention.

One particular control method is shown in FIG. 16 that illustrates a phase-control loop that is executed by the controller 94 in accordance with an implementation of the present invention. As shown, a PD1 tuning trigger (300, discussed below) starts the phase-control loop that begins by reading (310) the RF power in the pass band output by the RF detector 85. The controller 94 outputs a phase adjust command signal to the phase shifter 150 so as to increase (320) clock phase delay PD1 by a small amount X (e.g., 0.5 ps or less for a 40 Gps data rate).

Next, the controller 94 reads (330) a new RF power value output from the RF detector 85, representing the RF power in the pass band of band pass filter 80, and determines (340) whether the new RF power value is greater than the previous RF power value. If yes, the controller 94 again instructs the phase shifter 150 to increase clock phase delay by X (i.e., returns to 320). If, instead, the RF power value is not greater than the previous RF power value, the controller 94 outputs a command to the phase shifter 150 to decrease (350) clock phase delay PD1 by X. It may be advisable to increase the phase delay by 2 X in 350 to ensure that a change in the RF power is seen and so that the loop does not get stuck with an RF power value that does not change despite small X changes in the phase delay.

The controller 94 then reads (360) the new RF power value and determines (370) whether the new RF power value is greater than the previous RF power value. If yes, the controller 94 outputs a command to the phase shifter 150 to again decrease clock phase delay by X (i.e., return to 350). If, however, the new RF power value is not greater than the previous RF power value, the controller 94 commands the phase shifter 150 to increase (380) clock phase delay by X. The phase control method is then complete (390) which means that the phase shift PD1 is maintained at that level (i.e., maintain correct alignment of the CSRZ pulse carver). This phase-control loop may be continuously executed to maintain phase alignment but is preferably triggered by PD1 tuning trigger 300.

The PD1 tuning trigger 300 may take a variety of forms. The simplest form is a simple delay timer the expiration of which serves as the tuning trigger 300. In this way, the phase tuning will occur at regular intervals. Alternatively, the PD1 tuning trigger 300 may be a manual calibration switch (not shown) that a technician or operator could turn on to trigger (300) PD1 tuning. The calibration switch may be a physical switch or a soft switch set by a computer.

In another alternative, the PD1 tuning trigger 300 may be actuated by an alarm signal. Alarm signals of all types and severity are quite common in optical networks and could be used as a PD1 tuning trigger 300. For example, a high BER (bit error rate) will raise a "signal-degraded" alarm. In an attempt to compensate an optical network manager may try to bring PD1 into correct alignment by raising the PD1 tuning trigger 300. The raising, routing, detection and handling of alarm signals are conventional processes that could be leveraged by the invention to help provide a more comprehensive network managing system.

Moreover, the transmitter 2 is preferably set to the optimum phase at the factory by maximizing the band-pass-filtered RF power. Furthermore, a calibration table may be generated that contains values of the filtered RF power as a function of the phase shifter 150 voltage settings. At the time of field installation, a control program can be executed by controller 94 that intentionally sweeps the phase (adjusts the phase shifter 150) and locates the optimum location (e.g. using the algorithm of FIG. 16). The phase shifter 150 setting and the maximum RF power reading can be stored in a memory of the controller 94.

During normal course of operation, the control algorithm maintains the detected power at its maximum setting. If the detected power shows a small deviation (say +/−0.5 dB), then the PD1 tuning trigger 300 may be set which causes the phase shifter 150 to moved by one step in one direction (e.g. increasing as shown). If the RF power drops, the phase shifter is moved in the opposite direction as also illustrated in FIG. 16 and described above. This operation is continued till a new optimum is found (390). Although environmental conditions can change the phase, it is expected that any such phase changes will take place over a long length of time (hours or days). Hence speed of operation is not important. This also allows for slow integration times in order to better filter out noise.

This invention is based on reaching a relative maxima of the filtered RF power to adjust PD1. Although the absolute power hitting the photodiode 60 is not important, any large changes in laser 10 power will cause erroneous operation. Commercial DFB lasers have very tight lifetime power drift specifications, and such power fluctuations are not expected to take place in practice. However, as a precaution an optical power reading from an optical power monitor port (not shown but conventionally part of DFB lasers) can also be conveniently stored in the memory of controller 94. Depending on the exact mechanics of the laser power drift and the control circuit tuning it is possible that the control circuit may not reach the intended maxima should laser power drift while the circuit is tuning. By storing laser power in memory, we can determine if the laser power was stable while the circuit was tuning. If it was found that the laser power had drifted, the control circuit may be asked to re-initiate its tuning procedure.

Control Circuit and Method for PD2

For PD2, the inventors discovered that if the phase shift deviated from pi radians, a clock component starts appearing at half the data rate. For perfect misalignment, the clock component is maximized and for perfect alignment the clock component is minimized. This behavior was confirmed using an RF spectrum analyzer but the inventive embodiments do not rely on such an expensive piece of equipment as an RF spectrum analyzer. Instead, the invention utilizes an elegant tuning scheme involving detecting the clock component at half the bit rate.

More specifically and as shown in FIG. 4, the CSRZ optical signal is detected by photodiode 60. The electrical output photodiode 60 may be amplified by amp 65 to match voltage levels with the mixer 100. The mixer 100 multiplies the O/E converted CSRZ signal by the transmitter half-rate (20 GHz) clock signal from ½ rate clock 5 in order to produce a DC component proportional to the level of the half-rate clock signal present in the CS-RZ optical spectrum. This IF (intermediate frequency) from the multiplier 100 is then low-pass filtered by low pass filter 110 to minimize the AC waveforms present from the spectral lines in the PRBS (pseudo random bit sequence which is a conventional bit sequence used to simulate actual telecom data traffic and which is useful in testing the system. The bit patterns of the PRBS appear in the time domain as a series of pulses and appear in the frequency domain as a series of spectral lines) waveform. The filtered signal is then integrated by integrator 120 and sent to an A/D converter (not shown) so that controller 96 can read the integrated value.

Controller 96 reads the integrated value and uses this value (phase delay 2 error signal) to control PD2. In general, controller 96 slowly varies the phase of one leg of the differential drive modulator making up the pulse carver 50 to minimize the half-rate clock component. When this half-rate component is minimized phase alignment to the differential clock carver will be optimal. This may be performed by the controller 96 sending a control signal to the variable phase shifter 170 which sits on one of the two legs of the dual arm modulator making up the pulse carver 50. The algorithm used by controller 96 to perform PD2 tuning may be very similar to the one shown in FIG. 16 for PD1 tuning except for the value read (half-rate clock component from integrator 120 instead of the RF power in the pass band) and the phase value adjusted (PD2 instead of PD1).

Sequence of Operation

Since PD1 and PD2 have unique RF characteristics that are fairly independent of each other (when both are near the optimum alignment point), there is no need for complex algorithms or set sequence of operation to coordinate tuning of PD1 and PD2. In the factory or installation, other instrumentation such as BERTs (bit error rate tester) and OSA (optical spectrum analyzer) may be utilized ensure that both PD1 and PD2 are not set too far away from the optimum. If no such instrumentation is available, then the inventive apparatus and method may be utilized to tune PD1 and PD2.

The independence of the control points utilized to control PD1 and PD2 also means that the circuits and methods for controlling PD1 and PD2 may be used separately in addition to the utility of combining these control techniques. FIG. 4 is essentially a combination of PD1 and PD2 control.

Figure 5:
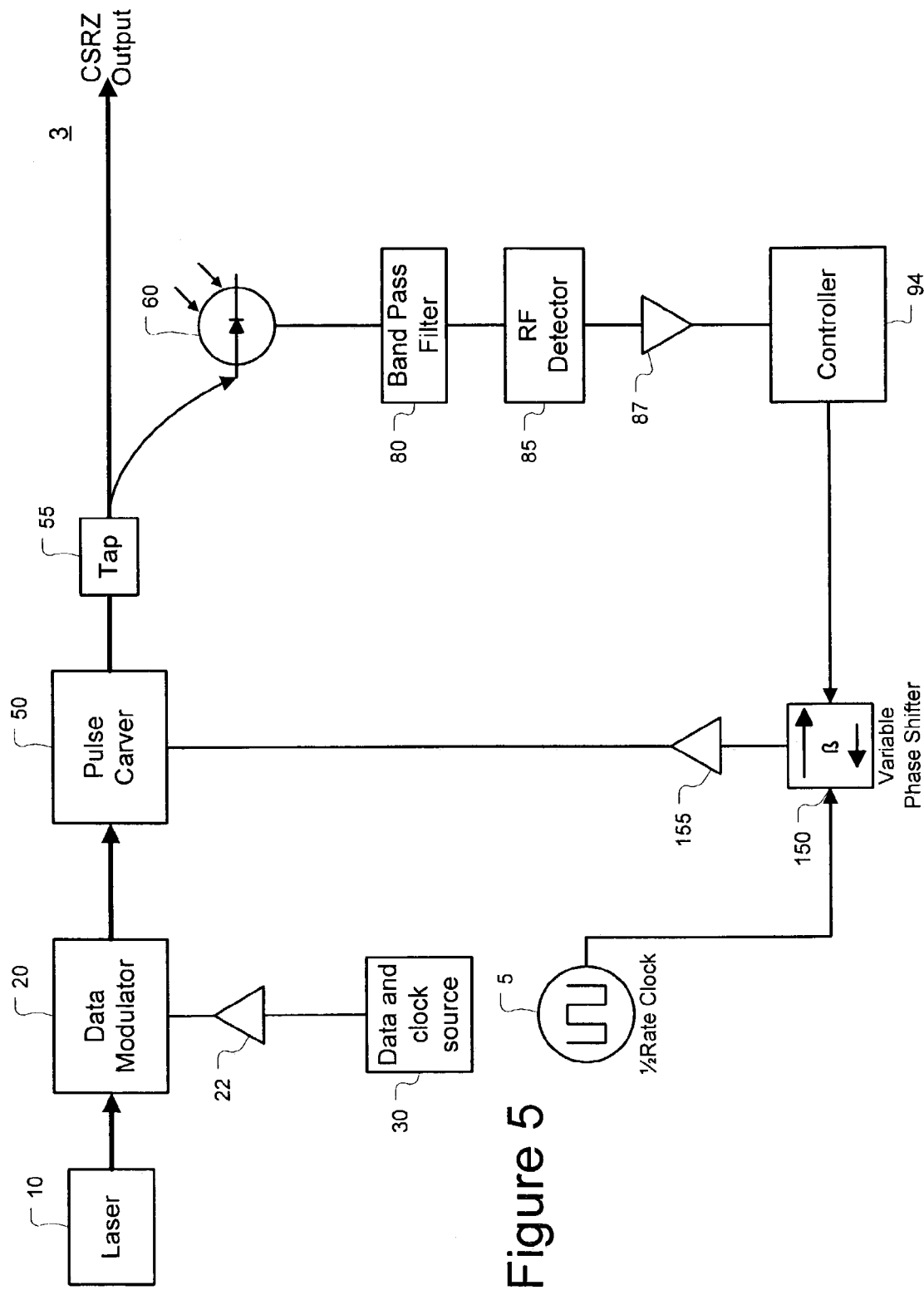
FIG. 5 is a block diagram of a CSRZ-based transmitter, which performs phase alignment between the data modulator and pulse carver in accordance with principles of the present invention.

FIG. 5, on the other hand, illustrates an optical transmitter 3 in which only PD1 control is exercised. Because the components of PD1 control (photodiode 60, bandpass filter 80, RF detector 85, controller 94 and variable phase shifter 150) are the same as those in FIG. 4 and because these components operate in the same fashion a detailed description thereof is not necessary.

Figure 6:
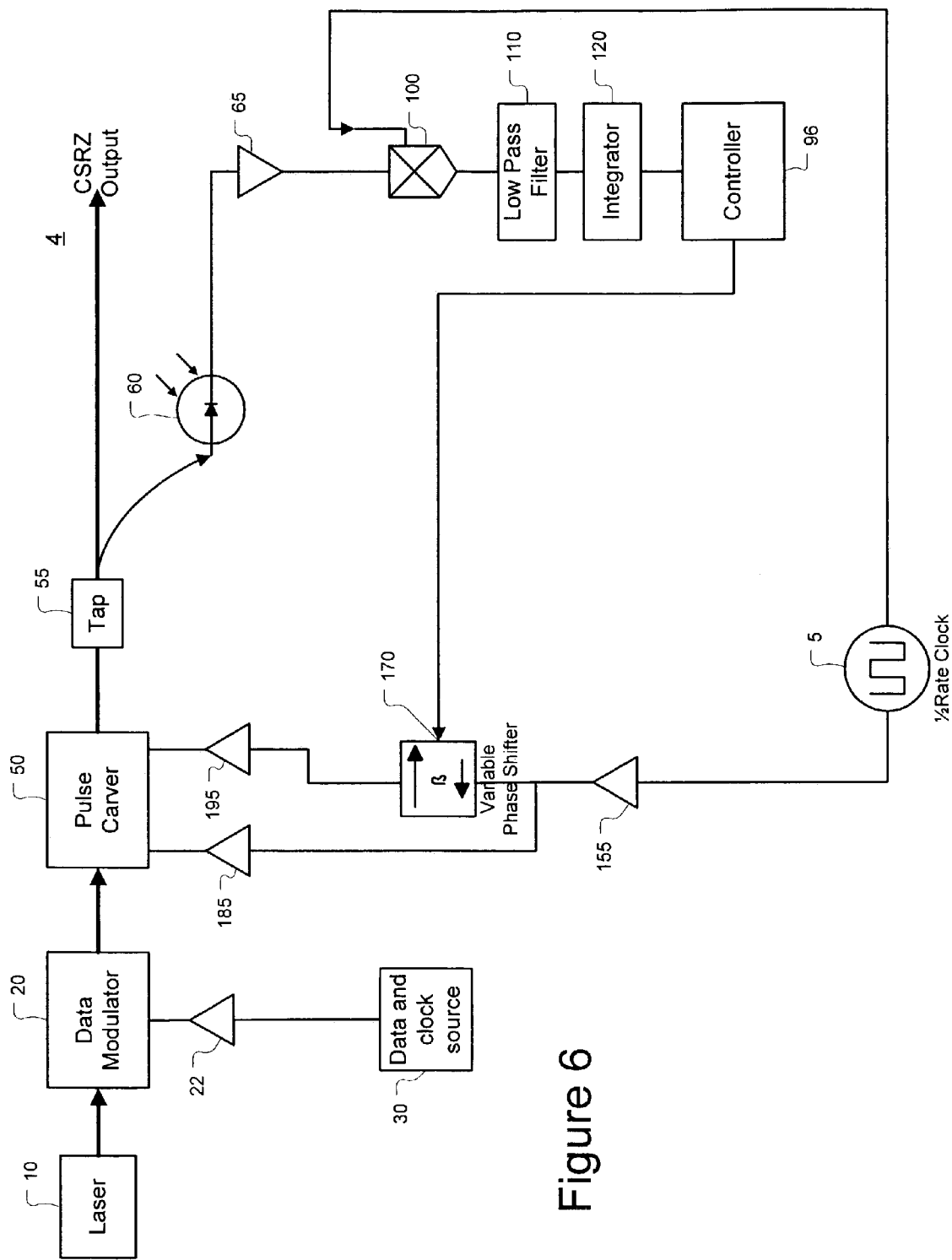
FIG. 6 is a block diagram of a CSRZ-based transmitter, which performs phase alignment between the arms of a dual-arm data modulator in accordance with principles of the present invention.

Likewise, FIG. 6 illustrates an optical transmitter 4 in which only PD2 control is exercised. Because the components of PD2 control (photodiode 60, mixer 100, low pass filter 110, integrator 120, controller 96 and variable phase shifter 170) are the same as those in FIG. 4 and because these components operate in the same fashion a detailed description thereof is not necessary.

Figure 7:
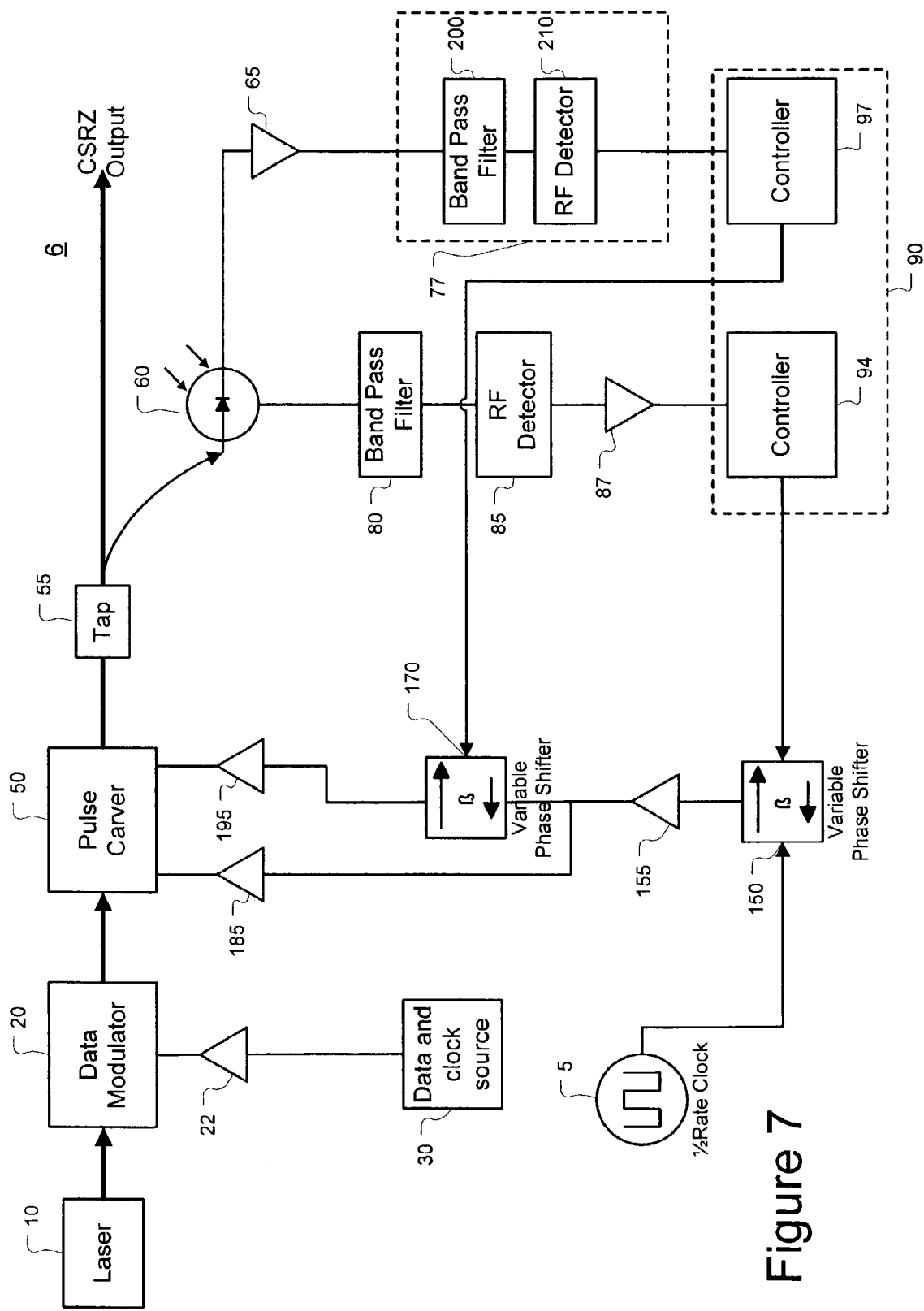
FIG. 7 is a block diagram of a CSRZ-based transmitter, which performs phase alignment between the data modulator and pulse carver and an alternative phase alignment between the arms of a dual-arm data modulator in accordance with principles of the present invention.

FIG. 7 illustrates an alternative PD2 control circuit 77. Actually, FIG. 7 shows the same PD1 control circuit described above in combination with an alternative PD2 control circuit 77. The alternative PD2 control circuit 77 includes a band pass filter 200 operatively connected to the photodiode 60; an RF detector 210 operatively connected to the band pass filter 200; and a controller 97 operatively connected to the RF detector 210. An amplifier 65 may be used to match voltage levels between the photodiode 60 and the band pass filter 200.

The band pass filter 200 preferably has the following characteristics: 3 dB bandwidth (approximately 7% or narrower) and having a center frequency that is ½ of the data rate. The bandpass filter 200 passes the ½ bit rate spectral line and the RF detector 210 provides a DC level output to the controller 97 that is proportional to the amplitude of this spectral line. The controller 97 adjusts the variable phase shifter 170 to minimize the DC output of the detector 210: when the DC output of RF detector 210 is minimized the two drivers 185 and 195 are phase aligned.

Results Showing Proof-of-Principle of Operation: PD1

Figure 8:
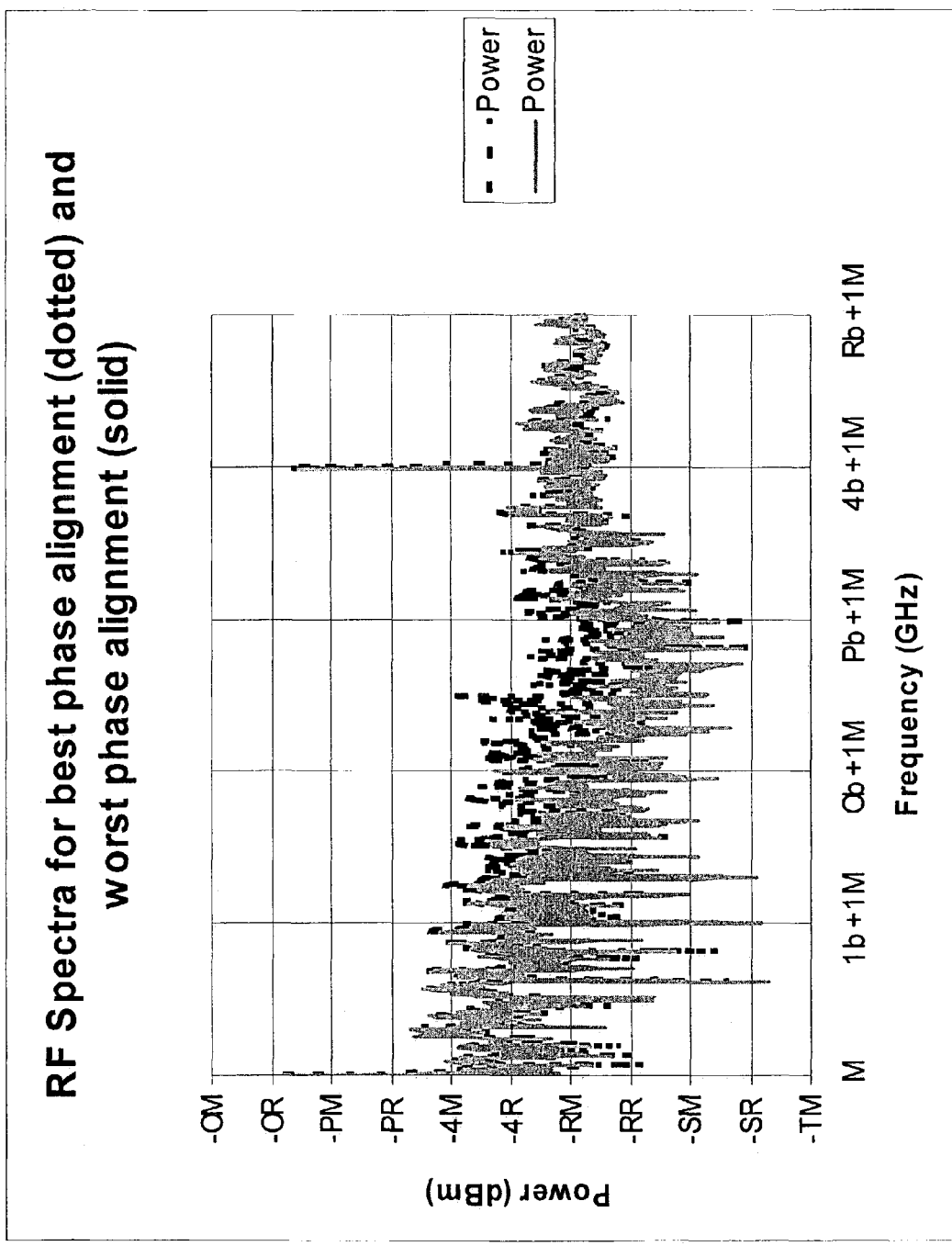
FIG. 8 is a graph depicting RF spectra utilized by the invention and corresponding to the best-aligned and worst aligned phase settings between data modulator and pulse carver.

FIG. 8 depicts RF spectra corresponding to the best-aligned and worst aligned phase settings for a 40 Gb/s transmitter. As can be clearly seen, the bandpass region between 20 GHz and 30 GHz allows for the excellent discrimination between the two cases with the bandpass region of 25 Ghz to 30 Ghz providing even better discrimination. In terms generic to the data rate, this translates to preferably using a band-pass filter with a band pass of between 0.5 $f_o$ and 0.75 $f_o$ where $f_o$ is the data rate (frequency of the data and synchronous clock source 30). The most preferred embodiment, as confirmed by experimental results, utilizes a pass band for band pass filter of between 0.627 $f_o$ and 0.75 $f_o$.

Figure 9:
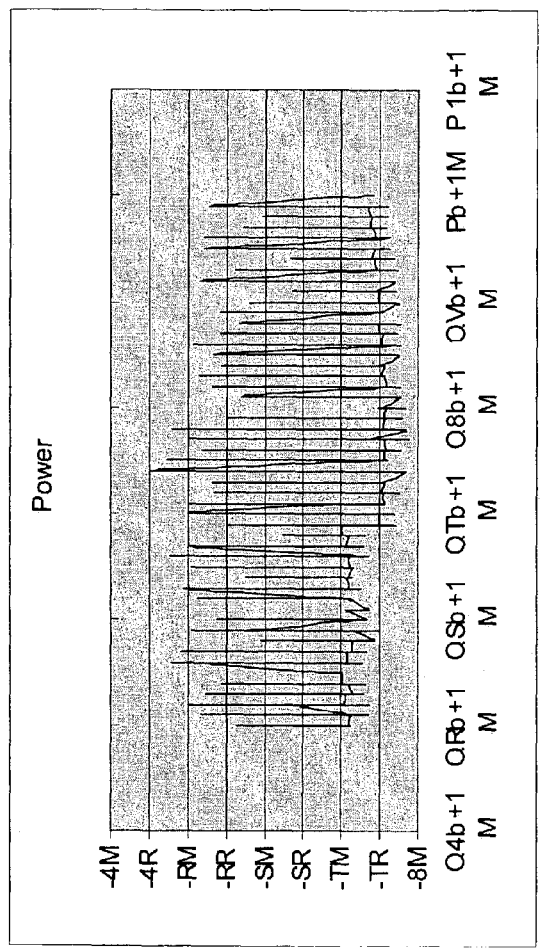
FIG. 9 is the RF spectra measured by the invention and taken between 20 GHz and 30 GHz and in which the first phase (between the data modulator and the pulse carver) is in alignment.
Figure 10:
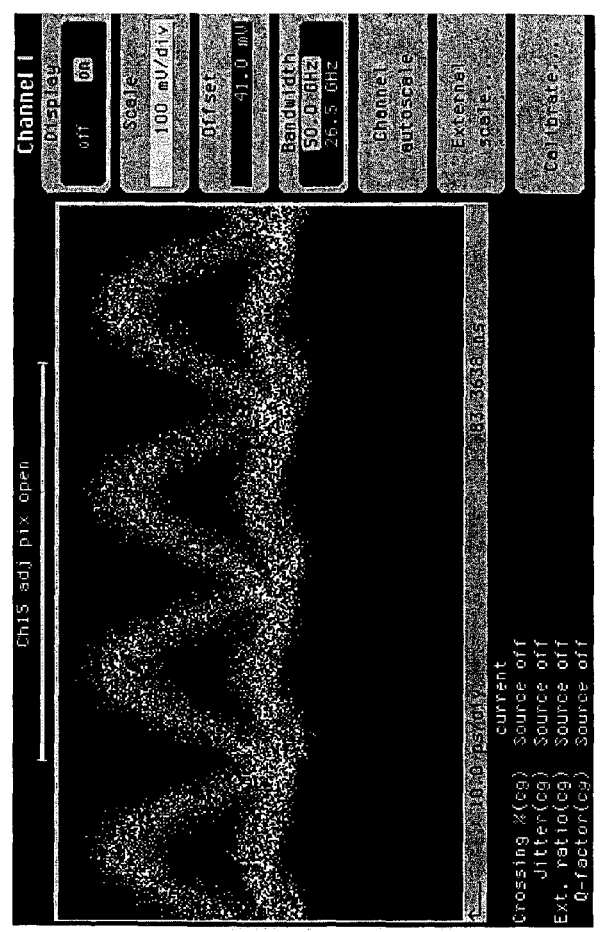
FIG. 10 is an eye trace corresponding to the RF spectra of FIG. 9 according to the invention and in which the first phase (between the data modulator and the pulse carver) is in alignment.
Figure 11:
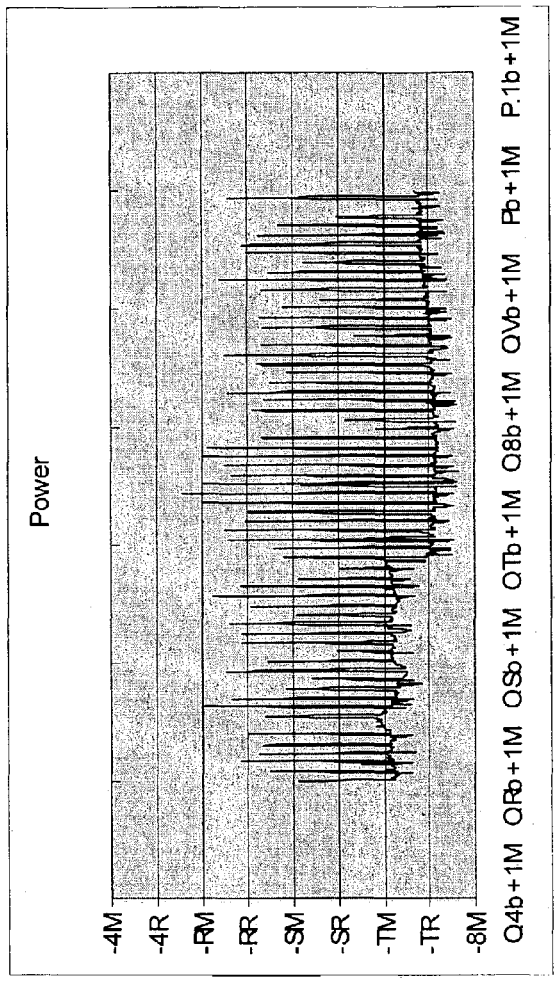
FIG. 11 is the RF spectra measured by the invention and taken between 20 GHz and 30 GHz and in which the first phase (between the data modulator and the pulse carver) is not in alignment.
Figure 12:
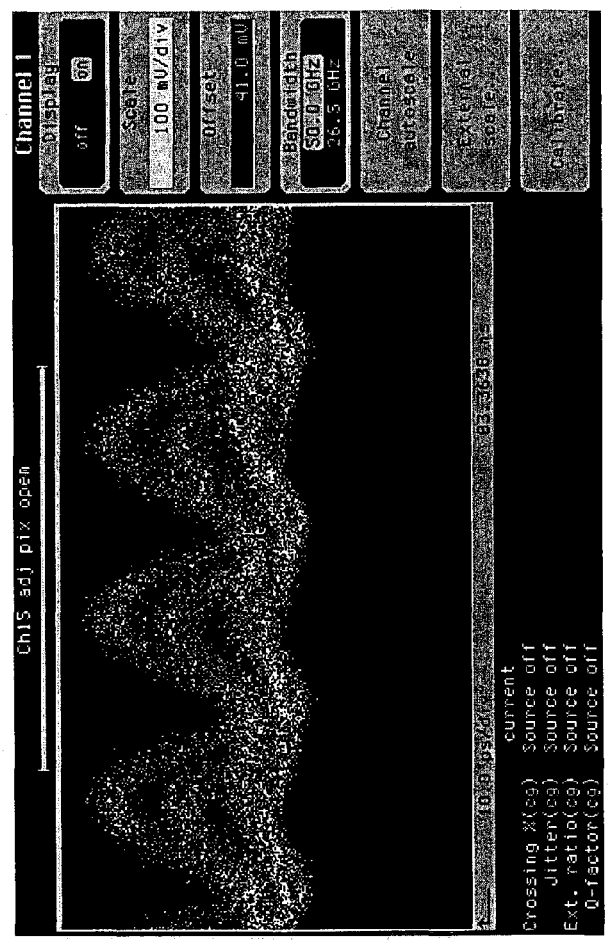
FIG. 12 is an eye trace corresponding to the RF spectra of FIG. 11 according to the invention and in which the first phase (between the data modulator and the pulse carver) is not in alignment.

FIGS. 9 and 11 contain several eye traces taken from a Digital Communications Analyzer (DCA or Oscilloscope) and FIGS. 10 and 12 shows the corresponding RF spectra between 20 GHz and 30 GHz clearly showing the correlation between open optical eyes and maximum RF filtered power. The eyes were captured as the phase PD1 was manually detuned. The sequence of events is from perfect phase alignment (FIGS. 9 and 10) to phase non-alignment (FIGS. 11 and 12).

Figure 13:
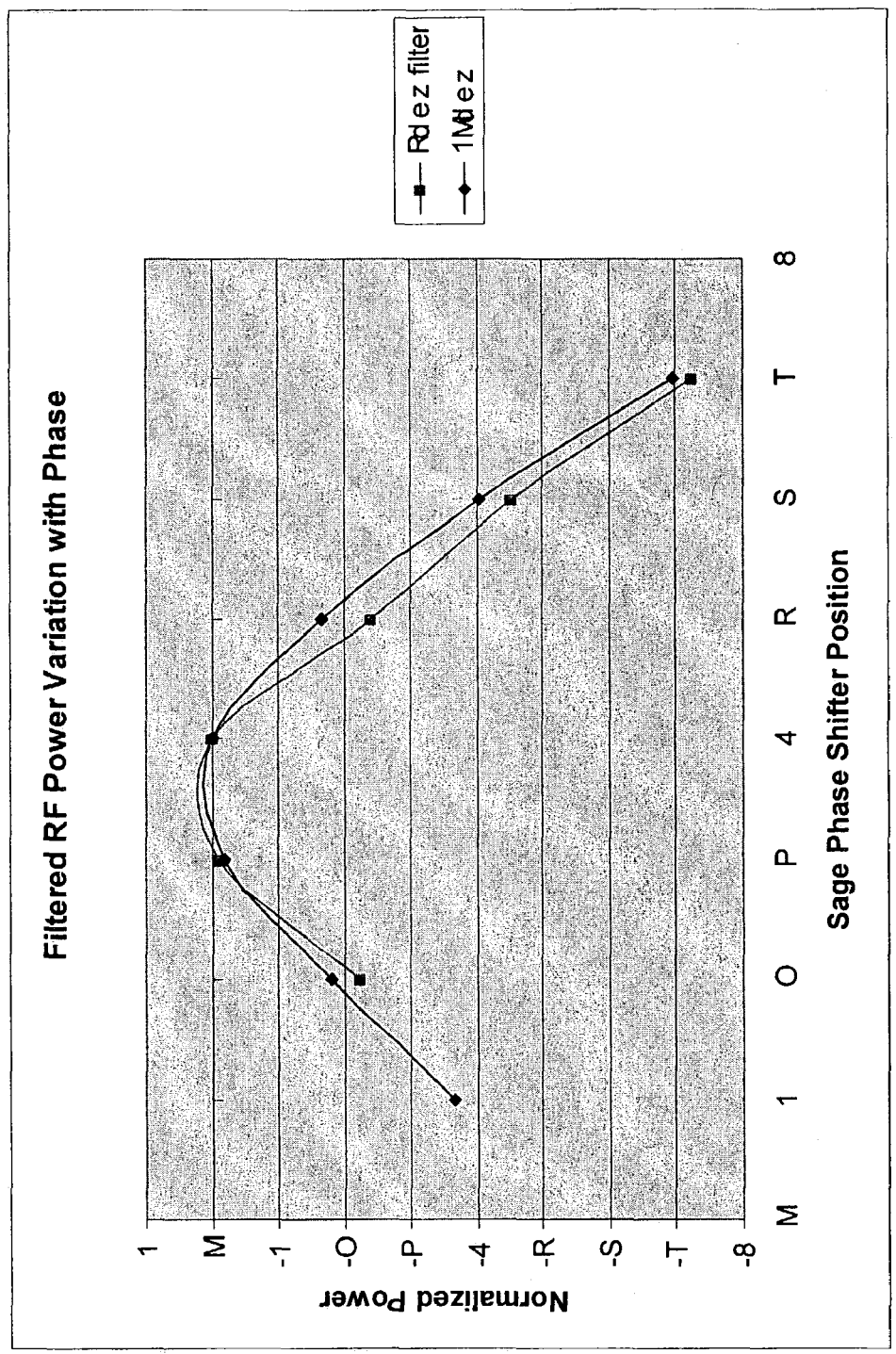
FIG. 13 is a graph showing the integrated RF power that passes through the band pass filter of the invention as a function of the phase (PD1) alignment for two different band pass filters (a 5 Ghz filter and a 10 Ghz filter)

FIG. 13 shows the integrated RF power that pass through the band pass filter 80 as a function of the phase (PD1) alignment for two different band pass filters 80 (a 5 Ghz filter and a 10 Ghz filter). Here the power integration is obtained as a simple summation of the spectrum analyzer trace data file. This is valid since the RF spectra are made up of discrete lines and the normalized power is the deciding factor. FIG. 13 clearly shows that the filter bandwidth has only a small impact on the resolution or fidelity of the measurement process. It also shows that the measurement system is not very sensitive to the exact bandwidth of the filter, thus any drifts in filter bandwidth over its lifetime can be ignored. Note that the roll-off from the peak using a 5 GHz filter (from 25 GHz to 30 GHz) is faster than the roll-off using the 10 GHz filter (from 20 GHz to 30 GHz). The steepness of the roll-off is important if the goal is to reach the peak, as it provides better discrimination of the optimal set-point. This a filter having roughly 5 GHz bandwidth roughly between 0.62 GHz and 0.75 GHz would be the preferred solution.

Figure 14:
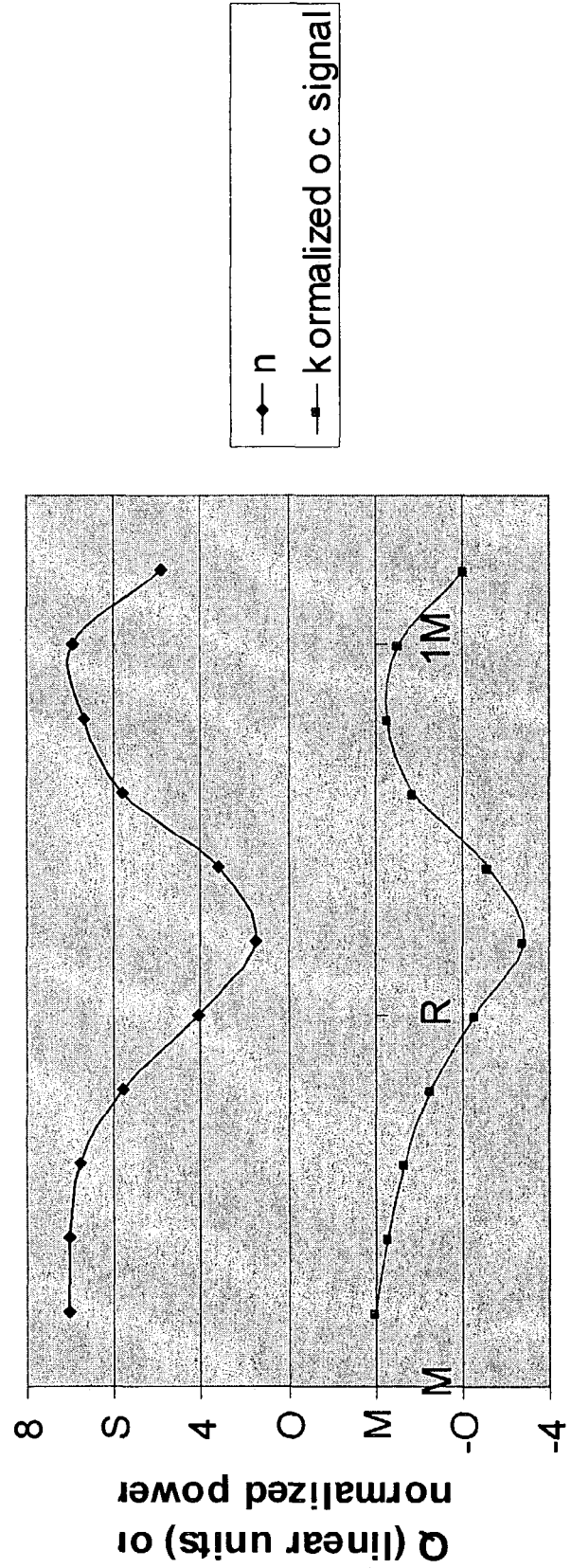
FIG. 14 is a graph showing the strong correlation of the measured Q as a function of the maximum filtered RF power according to the invention.

FIG. 14 shows the strong correlation of the measured Q as a function of the maximum filtered RF power. The bandpass filter 80 has a passband of 5 GHz. The x-axis is the phase shifter position and the y-axis corresponds to either Q or normalized filtered power. For convenience the system was noise loaded for these measurements. One can note that the dynamic range in RF power is about 4 dB and is smaller than the 7 dB seen in FIG. 13. since it was not possible to measure Q's below 2.4 linear units in the current set-up. This should not be a problem since the invention optimizes based on the maximum power and not the minimum power., Hence the depth of the trough is less important than the height of the peaks. Note that the phase delay locations for maximum Q and maximum filtered power coincide perfectly. Note also that the Q value is not extremely sensitive to small phase shifts as seen by the 1-2 phase settings that correspond to the maximum Q.

Results Showing Proof-of-Principle of Operation: PD2

Figure 15:
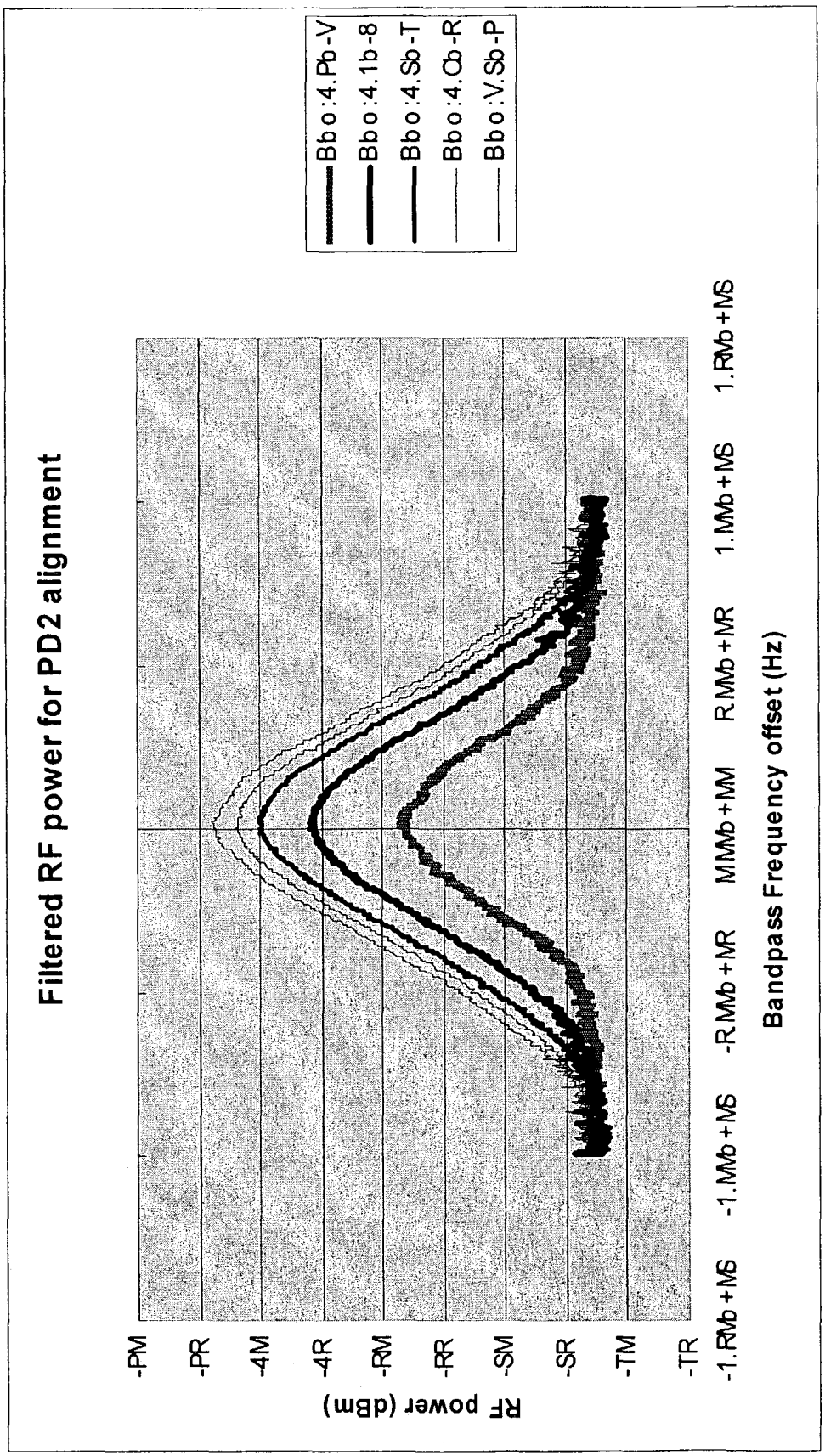
FIG. 15 is a graph illustrating the amplitude of the recovered clock signal for changes in phase shift PD2 between the two arms of the differential drive pulse carver, with the figure legend showing the corresponding bit error rates (BER's)

FIG. 15 shows the amplitude of the recovered clock signal at 19.9706 GHz for changes in phase shift PD2 between the two arms of the differential drive pulse carver 50. For measurement purposes the system was noise loaded so that the best BER was 4.3E−9. The measurement bandwidth on the spectrum analyzer was 2 MHz. For PD2 measurements, PD1 was held at alignment. As the phase shift between the two arms gets misaligned, a clock component starts appearing at half the data rate, reaching a maximum for maximum misalignment. As the phase starts getting aligned, the RF power at half the data rate drops reaching a minimum for perfect alignment. Note a few things about this scheme:
1) Although we are looking at half the data rate, we are monitoring PD2 and not PD1 phase delay.
2) There is very good correlation between the minimum in RF power, and the minimum BER.
3) The resolution near the minimum is very good. For a one order of magnitude change in BER (from 4.3E−9 to 4.1E−8) we get an 8 dB change in power. That not only allows the invention to nail the set point correctly, it also allows for some flexibility in choosing the RF components.

An algorithm to control PD2 can be constructed similar to the one shown in FIG. 16 the only difference being the decision point is now based on minimizing the RF power. Furthermore, the two algorithms (to control PD1 and PD2) can execute in any order.

Although the above-described implementation of the PD1 and PD2 control circuits 70, 75 each output a relative signal indicating fluctuations in the respective phase errors, these circuits 70, 75 may generate and output alternative signals indicating phase alignment/misalignment. For example, the PD1 control circuit 70 may compare a measure of RF power with a threshold to generate and output a signal indicating phase misalignment when the RF power drops below the threshold. An appropriate threshold for such an implementation may be determined through a learning/testing process.

In accordance with principles of the present invention, CSRZ phase alignment and dual arm pulse carver phase alignment may be achieved without complex processing or expensive spectrum analyzer hardware. Instead, various low-cost, narrow bandwidth electrical filters may be used to track changes in the RF power. Although embodiments of the present invention have been described above with respect to CSRZ binary modulation, principles the present invention may also be applicable to other forms of modulation, such as NRZ and RZ modulation and other forms of modulation that need dual drive modulators with a specific phase difference requirement between the two drives.

Unique and advantageous features of this invention include the following. The invention is independent of the transmitter laser 10 frequency. Thus, in a WDM system the same circuitry may be used for each wavelength channel that greatly simplifies construction and the logistical burden of providing spares parts for field-deployed equipment. The invention is compact, occupies very little real estate, consumes very little power, and is well suited for board level assembly. These features along with the frequency independent nature of the hardware can eventually lead to cost reduction due to economies of scale.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. A method of controlling a phase delay between first and second drive signals being applied to first and second arms of a dual-arm modulator of a pulse carver in an optical transmitter, the method comprising:
converting a portion of an optical output signal being output by the optical transmitter to an electrical signal;
multiplying the electrical signal by a ½ rate clock signal, wherein the ½ rate clock signal is synchronous to and ½ the rate of a data clock of the optical transmitter to generate a frequency component proportional to a level of the ½ rate clock present in the optical spectrum of the optical output signal;

low pass filtering the frequency component proportional to the level of the ½ rate clock present in the optical spectrum to minimize high-frequency waveforms;

integrating the low pass filtered frequency component to generate a phase error; and controlling the phase delay between first and second drive signals being applied to first and second arms of the dual-arm modulator of the pulse carver based on the phase error between the first and second arms of the dual-arm modulator of the pulse carver.

2. The method according to claim 1, wherein the dual arm modulator is a dual arm Mach Zehnder modulator.

3. The method according to claim 1, wherein the optical transmitter is a CSRZ optical transmitter and the optical output signal has a CSRZ format.

4. The method according to claim 1, wherein the phase delay is π radians.

5. The method according to claim 1,
said controlling the phase delay step controlling the phase delay between first and second drive signals being applied to first and second arms of the dual-arm modulator by substantially maximizing the phase error.

6. The method according to claim 1,
said controlling the phase delay step controlling the phase delay between first and second drive signals being applied to first and second arms of the dual-arm modulator by incrementally adjusting the phase delay in an iterative fashion until the phase error is substantially maximized.

7. An optical transmitter for an optical communications system, comprising:

a light source generating an optical carrier signal;

first and second modulators optically coupled to said light source and being driven by first and second synchronous signals to modulate the optical carrier signal;

wherein said second modulator is a dual-arm modulator of a pulse carver driven by first and second drive signals being applied to first and second arms thereof;

an optical-to-electrical converter optically coupled to said first and second modulators, said optical-to-electrical converter converting a portion of the optical output signal to an electrical signal;

a mixer operatively coupled to said optical-to-electrical converter, said mixer multiplying the electrical signal by the second synchronous signal, wherein the second synchronous signal is synchronous to and ½ the rate of the first synchronous signal generate a frequency component proportional to a level of the ½ rate clock present in the optical spectrum of the optical output signal;

a low pass filter operatively coupled to said mixer, said low pass filter low pass filtering the frequency component proportional to the level of the ½ rate clock present in the optical spectrum to minimize high-frequency waveforms;

an integrator operatively connected to said low pass filter, said integrator integrating the low pass filtered frequency component to generate a phase error;

a variable phase shifter operatively interposed in one of the two signal pathways carrying the first and second drive signals being applied to the first and second arms of said dual-arm modulator of the pulse carver; and a controller operatively connected to said variable phase shifter, said controller controlling said variable phase shifter to adjust the phase delay between first and second drive signals being applied to first and second arms of said dual-arm modulator of the pulse carver based on the phase error between the first and second arms of the dual-arm modulator of the pulse carver.

8. The optical transmitter according to claim 7, wherein said first modulator is a data modulator optically coupled to said light source, said second modulator is the pulse carver optically coupled to said first modulator, the first synchronous signal is applied to said data modulator, the second synchronous signal is applied to said pulse carver, and the optical output signal has a CSRZ format.

9. The optical transmitter according to claim 7, wherein said second modulator is the pulse carver optically coupled to said light source, said first modulator is a data modulator optically coupled to said second modulator, the first synchronous signal is applied to said data modulator, the second synchronous signal is applied to said pulse carver, and the optical output signal has a CSRZ format.

10. The optical transmitter according to claim 7, wherein said dual arm modulator is a dual arm Mach Zehnder modulator and the phase delay is π radians.

11. The optical transmitter according to claim 7, said controller controlling said variable phase shifter to adjust the phase delay between first and second drive signals being applied to first and second arms of said dual-arm modulator by substantially maximizing the phase error.

12. A method of controlling a first phase delay between first and second synchronous signals being applied to a first and a second modulator of an optical transmitter and a second phase delay between first and second drive signals being applied to first and second arms of the second modulator, the method comprising:

converting a portion of an optical output signal being output by the optical transmitter to an electrical signal, the optical output signal being modulated by the first and second modulators;

band pass filtering the electrical signal to extract a narrow frequency band having a frequency range of between $0.5f_o$ and $0.75f_o$ where $f_o$ is a data rate of the optical output signal and the frequency of the first synchronous signal;

detecting the RE power in the extracted frequency band to produce a band pass filtered RF power value;

controlling the first phase delay between the first and second modulators based on the band pass filtered RE power value;

multiplying the electrical signal by the second synchronous signal, wherein the second synchronous signal is synchronous to and ½ the rate of the first synchronous signal serving as a data clock of the optical transmitter to generate a frequency component proportional to a level of the ½ rate clock present in the optical spectrum of the optical output signal;

low pass filtering the frequency component proportional to the level of the ½ rate clock present in the optical spectrum to minimize high-frequency waveforms;

integrating the low pass filtered frequency component to generate a phase error; and controlling the second phase delay between first and second drive signals being applied to first and second arms of the dual-arm modulator based on the phase error.

13. The method according to claim 12, wherein the first modulator is a data modulator, the second modulator is a pulse carver, the first synchronous signal is applied to the data modulator, the second synchronous signal is applied to the pulse carver, the first modulator precedes the second modulator in the direction in which the optical output signal propagates, and the optical output signal has a CSRZ format.

14. The method according to claim 12, wherein the first modulator is a data modulator, the second modulator is a pulse carver, the first synchronous signal is applied to the data modulator, the second synchronous signal is applied to the pulse carver, the second modulator precedes the first modulator in the direction in which the optical output signal propagates, and the optical output signal has a CSRZ format.

15. The method according to claim 12,
wherein the narrow frequency band extracted by said band pass filtering has a frequency range of between $0.627f_o$ and $0.75f_o$.

16. The method according to claim 12,
said controlling the first phase delay step controlling the first phase delay between the first and second modulators by substantially maximizing the band pass filtered RF power value; and
said controlling the second phase delay step controlling the second phase delay between first and second drive signals being applied to first and second arms of the dual-arm modulator by substantially maximizing the phase error.

17. The method according to claim 12,
said controlling step controlling the first phase delay between the first and second modulators by incrementally adjusting the first phase delay in an iterative fashion until the band pass filtered PT power value is substantially maximized; and
said controlling the second phase delay step controlling the second phase delay between first and second drive signals being applied to first and second arms of the dual-arm modulator by incrementally adjusting the second phase delay in an iteratize fashion until the phase error is substantially maximized.

18. The method according to claim 12, wherein the dual arm modulator is a dual arm Mach Zebnder modulator.

19. The method according to claim 12, wherein the phase delay is $\pi$ radians.

20. An optical transmitter for an optical communications system, comprising:
a light source generating an optical carrier signal;
first and second modulators optically coupled to said light source and being driven by first and second synchronous signals to modulate the optical carrier signal;
an optical-to-electrical converter optically coupled to said first and second modulators, said optical-to-electrical converter converting a portion of the optical output signal to an electrical signal;
a band pass filter operatively connected to said optical-to-electrical converter, said band pass filter filtering the electrical signal to extract a narrow frequency band having a frequency range of between $0.5f_o$ and $0.75f_o$ where is a data rate of the optical output signal and the frequency of the first synchronous signal;
an RF detector operatively connected to said band pass filter, said RF detector detecting the RE power in the extracted frequency band to produce a band pass filtered RE power value;
a variable phase shifter operatively connected to said second modulator and receiving the second synchronous signal from a clock source, said variable phase shifter phase shifting the second synchronous signal driving said second modulator;
a controller operatively connected to said variable phase shifter and to said RF detector, said controller controlling said phase shifter to adjust the phase delay between the first and second modulators based on the band pass filtered RF power value,
wherein said second modulator is a dual-arm modulator driven by first and second drive signals being applied to first and second arms thereof,
a mixer operatively coupled to said optical-to-electrical converter, said mixer multiplying the electrical signal by the second synchronous signal, wherein the second synchronous signal is synchronous to and ½ the rate of the first synchronous signal generate a frequency component proportional to a level of the ½ rate clock present in the optical spectrum of the optical output signal;
a low pass filter operatively coupled to said mixer, said low pass filter low pass filtering the frequency component proportional to the level of the ½ rate clock present in the optical spectrum to minimize high-frequency waveforms;
an integrator operatively connected to said low pass filter, said integrator integrating the low pass filtered frequency component to generate a phase error;
a variable phase shifter operatively interposed in one of the two signal pathways carrying the first and second drive signals being applied to the first and second arms of said dual-arm modulator; and
a controller operatively connected to said variable phase shifter, said controller controlling said variable phase shifter to adjust the phase delay between first and second drive signals being applied to first and second arms of said dual-arm modulator based on the phase error.

21. The optical transmitter according to claim 20, wherein said first modulator is a data modulator optically coupled to said light source, said second modulator is a pulse carver optically coupled to said first modulator, the first synchronous signal is applied to said data modulator, the second synchronous signal is applied to said pulse carver, and the optical output signal has a CSRZ format.

22. The optical transmitter according to claim 20, wherein said second modulator is a pulse carver optically coupled to said light source, said first modulator is a data modulator optically coupled to said first modulator, the first synchronous signal is applied to said data modulator, the second synchronous signal is applied to said pulse carver, and the optical output signal has a CSRZ format.

23. The optical transmitter according to 20, said controller controlling said variable phase shifter to adjusted the phase delay between first and second drive signals being applied to first and second arms of said dual-arm modulator by substantially maximizing the phase error.

24. The optical transmitter according to claim 20,
said controller controlling the phase delay between said first and second modulators by incrementally adjusting the phase delay in an iterative fashion until the band pass filtered RE power value is substantially maximized.

25. The optical transmitter according to claim 20, wherein the dual arm modulator is a dual arm Mach Zehnder modulator.

26. The optical transmitter according to claim 20, wherein the phase delay is $\pi$ radians.

* * * * *